[3,520,835]

POLYURETHANE FOAMS AND THEIR METHOD OF PREPARATION USING STANNOUS SALTS OF ALIPHATIC ACIDS AND BETA-HYDROXY AMINES AS CATALYSTS

Edwin Fenton Chandley, Hazel Grove, Hugh Wallis Leigh, Grappenhall, Warrington, and Arnold John Lowe, Altrincham, England, assignors to Lankro Chemicals Limited, Eccles, England, a British company No Drawing. Filed Mar. 2, 1965, Ser. No. 436,674
Claims priority, application Great Britain, Mar. 12, 1964, 10,558/64

Int. Cl. C08g 22/46, 22/34
U.S. Cl. 260—2.5
5 Claims

ABSTRACT OF THE DISCLOSURE

This invention relates to polyurethane foams and to the use of novel catalysts in processes for making flexible polyurethane. The polyurethanes are prepared by reacting a polyfunctional organic isocyanate with water and a polyoxyalkylene compound containing at least two hydroxyl groups. The reaction is carried out in the presence of a foam stabilizing agent and a stannous salt of an aliphatic acid and a tertiary amine of not more than 11 carbon atoms and having from one to two beta-hydroxyl groups. The latter two mentioned compounds act as catalysts for the reaction which is carried out in the absence of other amine catalysts containing two nitrogen atoms in their molecules. The tertiary amine catalysts of the invention preferably possess one of the following chemical formulas

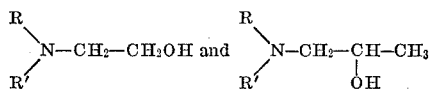

wherein R and R' represent alkyl groups.

BACKGROUND OF THE INVENTION

Flexible urethane foam is made by the well-known "one-shot" process. Most of the foam is made to exacting requirements with respect to such physical properties as tensile strength, tear strength, resistance to compression set and load bearing characteristics. It is important that these properties be maintained under conditions of use such as static and dynamic fatiguing, dry heat ageing and ageing under humid conditions over the years. Economic factors have necessitated material economies by the reduction of the densities of foams to between 1 lb. per cubic foot and 2 lbs. per cubic foot. Such economies have had to be achieved without sacrificing the physical characteristics of the foams. Under these conditions, the quality and economics of urethane flexible foams are remarkably good and not surprisingly, the means of production are well standardised throughout the world, both with respect to the chemicals involved and the means of reacting them.

It is well-known to make flexible polyether-based urethane foams by the reaction of a polyfunctional isocyanate with water and polyethers containing two or more hydroxyl groups in the presence of a foam stablising agent, a catalyst and optionally an auxiliary blowing agent. It is also well-known that the polyfunctional isocyanate most frequently used is a mixture of 80% 2:4 tolylene-di-isocyanate and 20% of 2:6 tolylene-di-isocyanate and that the hydroxyl terminated polyethers are generally the triols obtained by the condensation of 1:2 propylene oxide with glycerol so as to obtain polyethers with mole weights between 1,000 and 5,000 and more usually between 3,000 and 4,000. It is well-known that the foam stablising agent is desirably a poliysiloxane-polyoxyalkylene copolymer, one such silicone oil being the product L-520 and believed to have the following average composition:

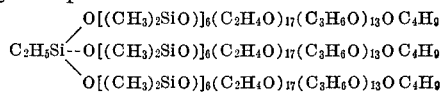

It is further well-known that the auxiliary blowing agents most frequently used are the halogenated hydrocarbons, particularly trichloro-fluoro methane and to a lesser extent methylene dichloride.

The catalysts used for the manufacture of flexible polyurethane foams are tin compounds used in conjunction with tertiary amines. The tin compound is almost invariably stannous octoate although occasionally stannous oleate or dibutyl-tin-dilaurate are used. The amine used to make most foam throughout the world is 1:4 diaza-bicyclo-octane otherwise known as triethylene diamine. This amine is generally used as the sole amine but is sometimes used in conjunction with N-methyl morpholine. The only other amines that are used to any extent are N,N,N',N'-tetramethyl-1:3 butane diamine and triethylamine. It is probably significant of the stringent requirements of modern urethane foam technolgy that out of the many thousands of catalyst combinations that have been suggested and evaluated, only one i.e. that of stannous octoate and 1:4 diazo-bicyclo-octane is widely used. This is even more remarkable when one considers that 1:4 diaza-bicyclo-octane costs between £5,000.0.0. and £7,000.0.0. per ton as compared with £400.0.0. per ton for triethylamine. This fact alone is a strong testimony in favor of the technical excellence and economy of "one-shot" production of foams made using the stannous octoate/1:4 diaza-bicyclo-octane catalyst system.

Despite its many advantages, 1:4 diaze-bicyclo-octane or triethylene diamine does present some problems. It is usually used at level of 0.1 part by weight to 0.2 part by weight per hundred parts of polyol. It is usually introduced in the reactants as an aqueous solution, in which the water to be reacted with the isocyanate is used to dissolve both the solid triethylene diamine and the siloxane oxyalkylene copolymer. Its high degree of reactivity causes its own problems: the difference between 0.1 part and 0.12 part of triethylene diamine may even represent the difference between a good foam and a bad foam. The uniform dispersion of the small amount of amine catalyst both in the initial liquid reactants and throughout the foaming partially-reacted mass is difficult. It is well-known that a flexible urethane foam is neither completely reacted nor cured until several hours or even days after it has been prepared. It is, therefore, important that the amine catalyst be retained during this curing period. In this respect, triethylene diamine is much better than the more volatile triethylamine and N-methyl morpholine. Despite its better retention, triethylene diamine is continuously being lost by evaporation from the foam. Apart from the effect on the curing characteristics of the foam, this loss causes an objectionable ammoniacal odor when the foam is used in confined spaces such as bedding and mattresses.

The use of diethanolamine and triethanolamine as tri-functional cross-linking agents for polyurethane has been well recognised. Tertiary amines, other than triethylene diamine, have in general either not been powerful enough or proved undesirable because of odor or failure to effect complete cure when used alone or with stannous octoate for "on-shot" foams.

The preparation of prepolymer foams using tertiary amines which are beta hydroxy amines has been disclosed but the teachings include the wringing of the foam to break the cells thereof and remove any trapped gases.

The salts of similar tertiary amines with fatty acids such as oleic acid have been suggested as catalysts for polyesterurethane foams. These catalysts are ineffective when used as the sole catalyst for "one-shot" urethane foams.

Tertiary amines produced by the reaction of a monoalkylamine or a dialkylamine with either ethylene oxide or 1:2 propylene oxide are considerably less basic than most of the amines that have been suggested or tested for "one-shot" foams. It was, therefore surprising to find that catalysts of this type, as more particularly defined hereafter, could be used in conjunction with a tin catalyst as the sole amine catalyst to produce excellent flexible urethane foams with good physical properties.

Accordingly, the invention provides a process for the preparation of flexible polyurethane foams which process comprises reacting a polyfunctional organic isocyanate with water and a polyoxyalkylene compound containing at least two hydroxyl groups, in the presence of a foam stabilising agent, a tin catalyst, and a tertiary amine catalyst having not more than 11 carbon atoms and containing at least one beta-hydroxyl group. The tertiary amine may contain two hydroxyl groups, e.g. two β-hydroxyl groups.

By a flexible polyurethane foam, we mean a polyurethane foam which on being compressed to 25% of its original height and maintained in this state for 22 hours at 70° C. will, on release, regain at least 90% of its original height in a period of 30 minutes.

The catalysts of the present invention may be used in the substantial absence of other amine catalysts containing two nitrogen atoms in their molecules. By the term "substantial absence" is meant less than 0.02 part by weight of said amine containing two nitrogen atoms per 100 parts by weight of the polyol.

The preferred hydroxyl-containing tertiary amines are the 2-hydroxyethyl or 2-hydroxypropyl dialkylamines of the general formulae:

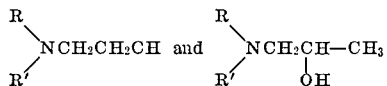

in which R and R' are alkyl groups and which may be made by reacting the dialkylamine

with ethylene oxide and 1:2 propylene oxide respectively. The especially preferred amines are N,N-dimethyl ethanolamine;

N,N-diethyl ethanolamine; N,N-dimethyl isopropanolamine; and N,N diethyl isopropanolamine.

Instead of the two groups R, R', the beta hydroxy monoalkanolamine can be made by reacting the alkylene oxide with a cyclic secondary amine such as piperidine. One of the $CH_2$ groups in the cyclic structure can be replaced by oxygen or any other group which is substantially non-reactive with the polyurethane intermediates e.g. N-(beta hydroxyethyl)-morpholine. Other cyclic amines include N-methyl, N-(beta-hydroxyethyl) cyclo hexylamine.

Other preferred amine catalysts are the dialkanolamines prepared by reacting ethylene oxide or 1:2 propylene oxide with mono alkyl amines. The preferred dialkanolamines are those containing less than eight carbon atoms and more particularly N-methyl diethanolamines and N-methyl diisopropanolamines.

The tin catalyst for use in the invention include those well-known for the manufacture of urethane foams by the "one-shot" process; they include the stannous salts of aliphatic organo acids and more preferably the salts of those acids containing more than four carbon atoms, such as stannous octoate, and stannous oleate. They include the stannous salts of organo acids containing more than four carbon atoms such as the stannous salt of gamma (2-methyl, 4-chloro-phenoxy) butyric acid and the stannous salt of gamma (tertiary butyl phenoxy) butyric acid. Part of the stannous salts may be replaced by organo tin compounds with a direct carbon-tin bond such as dibutyl tin dilaurate.

The preferred alkanolamine or mixture of the preferred alkanolamines may be used as the sole amine catalyst or a part thereof may be replaced by nonhydroxylic tertiary amines such as triethylamine or N-methyl morpholine. The use of non-hydroxyl containing tertiary amines in conjunction with the alkanolamines of the present invention is not very desirable as they create noxious odours and disturb the balance between the polymerisation and gas-evolution catalysis. The use of amines that have a powerful effect on the isocyanate-hydroxyl reaction should be avoided, in particular, triethylene diamine, N,N,N',N'-tetramethyl 1:3 butane diamine, and N,N,N',N'-tetramethyl ethylene diamine should not be used other than in trace amounts of less than 0.02 part per 100 parts of polyol as they catalyse the reaction of isocyanate groups and destroy the catalyst balance.

The less preferred alkanolamines i.e. those containing between 7 and 11 carbon atoms may occasionally be used with advantage as the sole amine catalyst, but generally the rate of rise of the foam is too slow using these materials. As Examples 2 and 3 show, doubling the amount of this type of amine catalyst only reduces the rise time (as defined herein) by about 10%, but at the same time the foam becomes less porous and subject to deleterious changes in physical properties during commercial use. The higher molecular weight alkanolamines have also the disadvantage that they cost more per lb. and furthermore have to be used in amounts constituting a larger proportion of the weight of materials used to form the foam.

The preferred polyoxyalkylene compounds for making flexible polyurethane foams are the polyoxyalkylene glycol ether diols of molecular weight 1,000 to 3,000 and polyoxyalkylene glycol ether triols of molecular weight 1,000 to 6,000.

The polyhydroxy polyoxyalkylene glycol ethers can be made by known methods and are preferably made by reacting 1:2 propylene oxide in the presence of an alkali metal catalyst with conventional low molecular weight initiators which may include ethylene glycol, 1:2 propylene glycol, butane diol or diethylene glycol to produce dihydroxy terminated polyethers; glycerol, trimethylol propane or hexane triol to produce trihydroxy glycol ethers; pentaerythritol or alpha methyl glucoside to produce tetrols and sorbitol to produce hexols. Although homo-polymers of 1:2 propylene oxide are preferred, co-polymers of ethylene oxide and 1:2 propylene oxide containing up to 20% by weight of oxyethylene residues may be used with advantage in some forms of the invention. Some of these polyethers are described in application No. 336,021. Mixtures of one or more polyhydroxy polyoxyalkylene glycol ethers may be used. Preferred catalysts for the polymerisation of the alkylene oxide are sodium metal dissolved in the initiator to give a sodium alkoxide, sodium methoxide, caustic soda or caustic potash, as these tend to produce secondary alcohols from the polymerisation of 1:2 propylene oxide.

The organic polyisocyanate used in the reaction may be an aliphatic, aromatic or cyclo aliphatic compound and may contain substituent groups provided that such groups do not interfere with the urethane reaction. The preferred isocyanate compounds are those containing 2 isocyanate or isothiocyanate groups. Examples of such compounds are polymethylene diisocyanate and diisothiocyanate; hexamethylene diisocyanate; xylene diisocyanate; 1-methyl 2:4 phenylene diisocyanate; 1-methyl 2:6 phenylene diisocyanate; 4,4' diisocyanate-diphenyl methane.

The preferred isocyanates are the aromatic diisocyanates. The especially preferred isocyanates are the tolyl ene di-isocyanate containing 80% of tolylene-2:4 di-isocyanate and 20% of tolylene-2:6 di-isocyanate.

The preferred foam stabilisers are the polysiloxane polyoxyalkylene copolymers the preparation of which are described in British patent specification No. 804,369 and in British patent specification No. 931,939, British patent specification No. 978,284 and application No. 383,911, now abandoned.

Silicone oils that may be used include the product L-520, described hereinabove.

Other preferred foam stabilisers include the product B-617 believed to be a polysiloxane oxyalkylene copolymer containing about 25% of polysiloxane and 75% of an oxyalkylene copolymer in which the oxyalkylene block contains between 50 and 60% by weight of oxypropylene residues and between 50 and 40% by weight of oxyethylene residues. The preferred siloxane oxyalkylene copolymers contain between 15 and 30% by weight of polysiloxane residues and between 85 and 70% by weight oxyalkylene residues. The oxyalkylene residues preferably contain between 50 and 75% by weight of oxypropylene residues and between 50 and 25% by weight of oxyethylene residues.

In making the flexible foam by reacting the polyisocyanate, a polyhydroxy polyoxyalkylene glycol ether and water, the reaction between the isocyanate groups and the water provides additional cross-linking in the polymeric structure and simultaneously produces the carbon dioxide used as a blowing agent. Auxiliary blowing agents, usually halogenated hydrocarbons, are advantageously used to obtain soft but resilient foams. The blowing agent may advantageously be trichlorofluoro methane, dichloro difluoro methane or methylene dichloride.

The amount of organo polyisocyanate used is preferably between 75% and 110% and usually between 103% and 108% of the stoichiometric amount required to react with all the hydroxyl groups and all the water present in the system.

The amount of water used to make the urethane foams may be varied between 1 part and 5 parts by weight per 100 parts of the polyhydroxy polyoxyalkylene glycol ether (referred to hereinafter as the polyol). The amount of foam stabiliser employed depends on the nature of the foam and is best illustrated by reference to the examples. In general there is preferably between 0.5 and 3.0 parts siloxyoxyalklene copolymer per hundred parts of polyol.

The amount of tin catalyst required again varies with the foam and is typified by the examples. The preferred amounts of tin salts range from 0.2 part to 1.2 parts per hundred parts of polyol, and more generally from 0.2 to 0.6 part of stannous octoate per hundred parts of polyol.

The amounts of tertiary alkanolamine catalyst required depends again on the type of foam and the molecular weight of the alkanolamine. Once again the quantities used are typified by the examples. The preferred amounts of alkanolamine catalyst are between 0.3 part to 3.0 parts by weight of amine catalyst per hundred parts of polyol. Using the preferred amines dimethyl ethanolamine, diethyl ethanolamine, dimethyl isopropanolamine, diethyl isopropanolamine, and methyl diethanolamine, the preferred quantities of amine catalyst are between 0.3 part and 1.2 parts per hundred parts of polyol.

In the delicate reaction systems to which mention is made later, it is desirable to choose the alkanolamine catalyst from the group dimethyl ethanolamine, diethyl ethanolamine, and dimethyl isopropanolamine. Of these three, the first is to be preferred as it is the most active and even using this alkanolamine it may be necessary to use 1.0 and 2.0 parts per 100 parts of polyol. Higher molecular weight alkanolamines containing between 7 and 11 carbon atoms are not desirable in these delicate formulations as they tend to cause the foam to become less porous and to make it more difficult to control the foaming during production.

Most flexible urethane foam is made on a continuous plant by reacting 100 to 500 pounds per minute of chemicals to give a continuous block of foam about 28 inches to 30 inches high and between 3 feet and 7 feet wide. The liquid reactants, after mixing in the mixing head, are deposited on to an angled conveyor. The rate of reaction is usually adjusted so that the increase in volume as reaction occurs takes place over a period of 60 to 120 seconds. It is important that there should be a period of between 10 to 15 seconds before foaming and volume increase occurs, and that thereafter the rate of volume increase shall be fairly uniform. It is important that the foam shall be free from physical defects such as splitting and that it should have sufficient mechanical strength to permit easy carriage along the conveyors through the heating tunnels to the cutting equipment.

In order that the foam may have good physical properties that do not deteriorate during use, it is important that the foam should have a fine regular structure and should offer a minimum resistance to the passage of air. Although most modern flexible foams have high percentages of open cells, there are frequently a number of closed micro cells or cells in which an inadequate number of cell membranes have been ruptured thereby leading to a spurious initial hardness in the foam. In service, the cell membranes which are restricting the free passage of gases, are ruptured thereby reducing their contribution to the load bearing properties of the foam and the overall hardness of the foam.

It is well-known that the gelation reaction caused by the reaction of the isocyanate groups with the hydroxyl groups is catalysed mainly by the tin catalyst while the expansion or blowing reaction between the isocyanate and the water is catalysed by the amine. As either the tin or amine catalyst can in part accelerate both reactions, either stannous octoate or the amine can in theory be used as the sole catalyst. In practice, probably only triethylene diamine among the known amine catalysts is sufficiently powerful for both purposes. In commercial practice the use of either catalyst alone is economically unacceptable and technically not practicable other than in the simplest of formulations. It is an advantage from the point of view of the foam producer to have control of the two reactions, blowing and gelation, as widely separated as possible. This permits easier control of the overall reaction system. It is an advantage of our invention that the alkanolamines are only weakly basic and while excellent blowing catalysts, they are poor gelation catalysts. This has proved exceedingly useful in more sensitive formulations such as those used to make super-soft foams when highly reactive low molecular weight polyols are reacted with a deficiency of isocyanate or any formulations in which methylene dichloride is used as a blowing agent when it is necessary to heat the reactants before mixing. The higher temperature leads to higher rates of reaction and the use of smaller amounts of catalyst. Other especially useful areas are in moulding and in producing those foams which incorporate inert fillers such as barium sulphate.

One of the problems of urethane foam technology has been the mixing in for short periods of time of hydrophilic and hydrophobic materials often of different densities and viscosities and usually under conditions where the hydrophilic material only represents a very small proportion of the total.

It is a feature of the present invention that the amine catalyst is bonded chemically to the urethane polymer by the reaction of its hydroxyl group with an isocyanate group. The catalyst is, therefore, uniformly distributed throughout the whole mass. The monoalkanolamines having only one hydroxyl group and being tertiary amines do not create short cross-linking bridges between adjacent polymer units. Such cross-linking is frequently associated with foams having poor compression set characteristics. The quantity of dialkanolamine catalyst required, usually less than 1% by weight or 5% by moles on the polyol is not sufficient to cause serious cross-linking. The uniform distribution of the blowing catalyst helps the avoidance of local areas of closed or partially closed cells. The chemical bonding of the amine to the foams leads to permanence which greatly assists the post foaming reactions and the subsequent slow cure of the foam. It also prevents the development of unpleasant ammoniacal odors.

The preferred dialkyl alkanolamine or alkyl dialkanolamine catalysts are mobile liquids, readily soluble in water, the polyol or the aqueous stream. They are relatively inexpensive to produce and need not be subjected to costly purification techniques as the presence of small quantities of commercial impurities such as alkyl dialkanolamines, trialkylamines and condensates of the type:

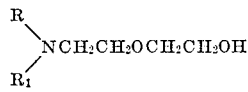

does not detract from the performance of the catalyst, as the impurities are still catalytically active. Fortunately, the price and viscosity advantages are at their greatest in the preferred methyl dialkanolamine, dimethyl and diethyl alkanolamines.

In general where less than 1% of the alkyl alkanolamines are used there is a sufficient excess of isocyanate in the reaction mixture without making any addition for that which will react with the hydroxyl group of the catalyst.

Following is a description by way of example of methods of putting the present invention into effect.

The foams prepared in the manner described in the following examples were tested according to the following procedures:

*Compression set.*—British Standard Specification No. 3379:1961, Appendix D: The test specimens, 5 x 5 x 2.5 cms. are compressed to 25% of their original height and maintained at 70° C. for 22 hours. After 30 minutes rest at room temperature, the loss in height is recorded as a percentage of the original height.

*Elongation at break and tensile strength.*—British Standard Specification No. 3379:1961, Appendix C: The tests are carried out on the cured foams and also after heat ageing for 16 hours at 140° C. and humidity ageing in a steam autoclave for 3 hours at 105° C.

*Indentation hardness characteristics.*—British Standard Specification No. 3667: Part 2: 1963: The procedure described in this specification was followed, using test pieces 2" thick, the results being expressed in lbs./50 square inches at 25%, 50% and 65% indentations.

*Resilience.*—Dropping ball technique: ASTM D 1564–59T Suffix R: A steel ball ½ inch in diameter is dropped from 18" on to the centre of the test specimen having a thickness of 2". The rebound height is expressed as a percentage of the drop height.

*Tear strength.*—ASTM Method D. 1564–59T (Suffix G Tear Resistance Test): Test specimens 6" x 1" x 1" are cut longitudinally to a depth of 1½". The two segments are pulled apart by the testing machine, operating at a jaw-separation speed of 2" per minute.

*Porosity test.*—This test has been devised to enable a comparison to be made between the porosities of similar sections of flexible urethane foams. Specimens of flexible foam 5.0 cms. in thickness cut from 10" square boxes of foam at distances between 7.5 cms. and 12.5 cms. from the base of the foam are placed between two ring clamps, 5 cms. in diameter spaced 5.0 cms. apart. A glass tube 1.9 cms. internal diameter, 2.45 cms. outside diameter, is placed concentrically with the foam supporting rings, is embedded 1 cm. into the centre of the foam test specimen, taking care not to cut or damage the flat surface of the foam. Air is passed through the tube at a rate of 8 litres per minute and the back pressure created by the presence of the foam to the passage of air is measured on a manometer containing ethanol as the indicating fluid.

The foam sample is reversed and the back pressure again noted. The values quoted under the heading of porosity in the subsequent tables in Examples 1, 2, etc., refer to the average of back pressures measured at the two surfaces of each sample of foam.

COMPARISON OF CATALYTIC ACTIVITY

In order to compare the catalytic activity of the hydroxy tertiary amines claimed in the present invention in the "one-shot" urethane foam system a standard handmixing procedure was devised. The procedure involves the utilisation of a fixed molar concentration of the amine under test in a set formulation using a standardised mixing procedure and reactant temperatures. The formulation used in Examples I and II is as follows:

| Component | Chemical Constituents | Parts by Weight |
|---|---|---|
| A | Polyoxypropylene triol (average mole weight = 3,000) | 100 |
|  | Stannous Octoate | 0.30 |
| B | Water | 3.6 |
|  | Silicone oil L-520 [1] | 1.0 |
|  | Amine catalyst | ([2]) |
| C | 80/20 Tolylene di-isocyanate (T.D.I. Index = 108) [3] | 47.0 |

[1] Described hereinabove.
[2] 4.3 millimols.
[3] The term T.D.I. Index, with reference to the preparation of "one-shot" urethane foams, defines the excess of tolylene di-isocyanate employed in the formulation over and above the stoichiometric requirement of the hydroxyl containing bodies, their acidities, water contents and additional water employed to produce carbon dioxide for expansion of the foams.

The quantity of tolylene di-isocyanate T in p.b.w. required to react with 100 p.b.w. of a polyether having:

hydroxyl value—H mg. KOH/gm.
acid value—A mg. KOH/gm.
water content—w. percent in a formulation employing additional water=W (in p.b.w. per 100 of polyol) is given by:

$$T = \frac{\text{T.D.I. Index}}{100}[0.155 \times (H+A) + 9.67(W+w)]$$

In the preparation of foams described in the examples, Component A 300 grams was weighted into a polythene beaker, Component B consisting of a solution of silicone oil L-520 3 p.b.w., dissolved in 10.8 p.b.w. of water and containing the appropriate quantity of the amine under test was blended with Component A for 20 seconds at low mixing speed, avoiding inclusion of air as far as possible. The temperature of the blend was adjusted to 22° C. Mixing was effected by means of a flat disc-type stirrer 5.7 cms. in diameter, having eight D-shaped cups punched from its upper surface 0.8 cm. from the periphery of the disc. The rotation of the disc was adjusted to enable the open sides of the cups to face in the direction of rotation. The disc stirrer was driven by a rheostat-controlled ⅛ H.P. electric motor, with maximum speed under load 7000 r.p.m.

Following blending and temperature regulation of the components A, B and C, Component C (141 gms.) was added quickly to Components A and B in the beaker and the whole stirred at maximum speed for 6 seconds. The foam mix was transferred to a 10" square cardboard container and a timing clock simultaneously started. The foam rise was judged to be complete by the appearance of health-bubbles on the foam surface and the time of rise noted. In instances where formulations proved unbalanced due either to low catalytic activity on the part of some amines used for comparative purposes or in instances where no amines are employed, no health-bubbles appeared and the rise time was judged to the point at which maximum height was achieved.

The foams were transferred to a hot air oven set at 120° C. and pre-cured for a period of ten minutes. Any tendency to shrink after completion of the rise was measured along the "tide-mark" at the sides of the box. The foams were then stripped from the boxes and cured at 120° C. for two hours.

A period of at least 18 hours was allowed before cutting and physical testing. In each case the products were sliced at 2.5 cms., 7.5 cms., 12.5 cms. and 15 cms. for the base the mid-section extending from 7.5 to 12.5 cms. being used in the determination of the Indentation Hardless Characteristics, average foam density and porosity. The section from 12.5 to 15 cms. was employed for the compression set test.

EXAMPLE I

The foam samples 1A to 1J were produced according to the standard conditions described above in respect to general procedure. Divergences from the standard procedure are shown in the table below in respect to the quantities of catalysts used. The only other change from the standard procedure was during the preparations of the foams 1D, 1E and 1F, when it was necessary to reduce the mixer speed to 2500 r.p.m. Despite the fairly high incidence of closed cells, the foams other than 1D, 1E and 1F had a fine regular structure and had densities of $1.75 \pm .07$ lb./cu. ft. density. With the exception of the 3 foams, 1D, 1E, 1F, the rest had compression sets of less than 10%. The results of the experiments which are discussed below show that neither stannous octoate nor dimethyl ethanolamine are satisfactory as sole catalysts.

in the rise time and had been necessary to ensure an open, porous and commercially acceptable foam. Doubling the amount of stannous octoate (Example 1C) decreased the rise time to 95 seconds showing that stannous octoate is a poor blowing catalyst, but the foam was closed to touch, having a considerably greater number of closed cells than Example 1B and a porosity figure of 24.7. It would have been unacceptable commercially. Examples 1D, 1E, 1F demonstrate that one of the preferred catalysts, N,N' dimethylamino ethanol, is ineffective as a sole catalyst even when used as levels that would be considered impractically high. The foams were crumbly and split badly. The next series (Examples 1G to 1J inclusive) revert to the preferred 0.3 level of stannous octoate and attempt to use the alkanolamines that have previously been suggested as cross-linking agents for urethane foams as the amine catalyst. These are monoethanolamine, diethanolamine, triethanolamine and triisopropanolamine. Other than a slight indication in the case of triisopropanolamine, there is no evidence of catalytic activity as assessed by a decrease in the rise time compared with stannous octoate only and, as might have been expected, there is an increased content of closed cells and even further decrease in porosity.

EXAMPLE II

The experiments 2A to 2L whose results are shown in the table below were carried out in accordance with the standard foaming conditions and test procedure described above. In these experiments 0.3 part of stannous

| Example Number | Amine Type | Amount | Stannous octoate | Rise time (secs.) | Porosity (cms.) |
|---|---|---|---|---|---|
| 1A | Triethylene diamine | 0.12 | 0.3 | 80 | 1.7 |
| 1B | | | 0.3 | 136 | 10.1 |
| 1C | | | 0.6 | 95 | 24.7 |
| 1D | Dimethyl ethanolamine | 0.38 | | 240 | (1) |
| 1E | do | 1.14 | | 116 | (1) |
| 1F | do | 2.28 | | 91 | (1) |
| 1G | Monoethanolamine | 0.26 | 0.3 | 136 | 26.9 |
| 1H | Diethanolamine | 0.45 | 0.3 | 138 | 13.0 |
| 1I | Triethanolamine | 0.64 | 0.3 | 146 | 30.8 |
| 1J | Triisopropanolamine | 0.82 | 0.3 | 128 | 16.5 |

[1] Foams too poor to test.

A polyurethane foam was made at the start of this series using a fairly standard commercial catalyst system comprising of 0.12 part of triethylene diamine and 0.3 part of stannous octoate per hundred parts of polyol as catalyst. This foam rose to its maximum height in 80 seconds and when tested in our standard porosity apparatus, as described above had a resistance of 1.6 cms. The foam in respect of "rise time" and porosity, and other physical properties compared favourably with commercial foam of similar densities. Under our standard porosity test, a value of less than 2.5 cms. is good and closed cells cannot be detected in this foam. At a value of 7.5 cms., closed cells are detectable by touch and above 10 cms. closed cells are very pronounced, although still not in sufficient quantity to cause shrinkage, or distortion of the foam. In the second of our standard experiments, the triethylene diamine was omitted from the formulation but the stannous octoate level maintained at 0.3 part per hundred of polyol. The rise time increased to 136 seconds and the porosity factor to 10.1, showing that the triethylene diamine had been responsible for a reduction of 50 seconds octoate were used together with 4.3 millimoles per hundred parts of polyol of the tertiary amino alcohols of the present invention. All the foams produced had densities of $1.75 \pm 0.07$ lbs./cu. ft. and compression sets of less than 10%.

| Ex. No. | Amine Type | Amount | Stannous octoate | Rise time (secs.) | Porosity (cms.) |
|---|---|---|---|---|---|
| 2A | Triethylene diamine | 0.12 | 0.3 | 80 | 1.7 |
| 2B | | | 0.3 | 136 | 10.1 |
| 2C | Dimethylamino ethanol | 0.38 | 0.3 | 85 | 0.9 |
| 2D | Dimethyl isopropanolamine | 0.44 | 0.3 | 100 | 3.4 |
| 2E | Diethylamino ethanol | 0.50 | 0.3 | 104 | 1.0 |
| 2F | Di-n-butyl amino ethanol | 0.74 | 0.3 | 110 | 1.4 |
| 2G | Methyl diethanolamine | 0.51 | 0.3 | 115 | 3.0 |
| 2H | Di-n-butyl isopropanolamine | 0.80 | 0.3 | 116 | 2.2 |
| 2I | Hydroxy ethyl morpholine | 0.56 | 0.3 | 125 | 2.3 |
| 2J | n-Butyl diisopropanolamine | 0.81 | 0.3 | 137 | 9.1 |
| 2K | Di-(2-ethyl hexyl) ethanolamine | 1.22 | 0.3 | 140 | 8.5 |
| 2L | Di-(2-ethyl hexyl) isopropanolamine | 1.28 | 0.3 | 142 | 10.1 |

Examples 2C–2I using dialkyl monoalkanolamines with less than 11 carbon atoms or monoalkyldialkanolamines with less than 8 carbon atoms show diminished rise time compared with the standard 2B using stannous octoate alone indicating catalytic activity on the blowing reaction. The best compared well with the rise time of the standard formulation (2A) which uses triethylene diamine and stannous octoate. The more active of the amine catalysts used in accordance with the examples produce foams with an even better porosity than the commercial standard, while all are readily acceptable.

It is to be seen that at equimolar concentration, the catalytic activity as measured by the rise time falls off with increasing molecular weight. Examples 2J, 2K and 2L use alkanolamines of even higher molecular weights and it is seen that at these concentrations, no catalytic activity is evidenced, the rise times being equal or greater than the standard using stannous octoate only while the porosity is little, if any, better. We believe the decrease in catalytic activity is due to molecular complexity and steric hindrance. It will also be noted that the fastest of the standard formulations using 0.3 part of stannous octoate and 0.12 part of triethylene diamine (to 1.0 millimole of triethylene diamine) per hundred parts of polyol is as fast in rising as the most active amine (dimethyl amino ethanol) under test, although the latter is used at the 4.3 millimole level. The failure of mono ethanolamine and diethanolamine (primary and secondary amines respectively) can be accounted for by the rapid reaction which undoubtedly occurs between the $NH_2$ or NH group and an isocyanate group. This cannot account for the lack of activity in the triethanolamine and triisopropanolamine but the failure might be due to steric factors as it is generally believed that the great activity of triethylene diamine is at least in part due to the absence of steric hindrance.

EXAMPLE III

Experiments 3A to 3F, the results of which appear in the following table, were performed according to the standard foaming conditions and test procedure described under the heading "Comparison of Catalytic Activity." The amines tested were those described in Example II. Nos. 2G–2L which had exhibited medium or low catalytic activity when utilised at a concentration of 4.3 millimoles per hundred parts of polyol.

For the purpose of this example the concentration of amine employed in each experiment was increased to 8.6 millimoles per hundred of polyol in order to establish whether the foam rise times could be improved by this procedure without impairing other physical properties of the foams.

activation of the stannous octoate catalyst brought about by the higher stream temperature. Using diethylamino ethanol as the amine catalyst it is possible to prepare foams of low density using methylene chloride as blowing agent under the critical conditions outlined above. The formulation adopted in this example enabled a foam of density 1.25 lbs./ft.[3] to be prepared. On a large scale, the foam density would be expected to be reduced to approximately 1 lb./ft.[3] due to superior retention of the reaction exotherm.

|  | P.b.w. |
| --- | --- |
| Polyoxypropylene oxyethylene triol (AV.M.W.=3500) | 100 |
| Stannous octoate | 0.35 |
| Water | 4.8 |
| Diethylaminoethanol | 0.5 |
| Silicone oil L–520 | 2.0 |
| Methylene dichloride | 10.0 |
| 80/20 tolylene di-isocyanate (T.D.I. Index=106) | 57 |

The foams were resilient (Resilience=41%), of low density (1.17 lbs./ft.[3]) and possess the medium to low load-bearing properties characteristic of foams of this density. The porosity as determined by the method described above was 1.0.

EXAMPLE V

The preferred beta-hydroxy tertiary amine catalysts may be used in the preparation of flexible foams of the "super-soft" type. The principle in producing these foams involves the use of a formulation containing major proportion of a polyether triol of relatively high hydroxyl value and a T.D.I. index of substantially less than 100. The main aim is to produce a flexible foam having a low indentation hardness index and a very low resilience, without sacrificing the low compression set, characteristic

| Ex. No. | Amine | Rise time (sec.) at— | | Porosity (cm.) at— | |
| --- | --- | --- | --- | --- | --- |
|  |  | 4.3 milli-moles | 8.6 milli-moles | 4.3 milli-moles | 8.6 milli-moles |
| 3A | Methyl diethanolamine | 115 | 108 | 6.2 | 6.0 |
| 3B | Dibutylisopropanolamine | 116 | 119 | 2.2 | 4.4 |
| 3C | Hydroxyethylmorpholine | 125 | 118 | 2.3 | 5.7 |
| 3D | Di-(2-ethyl hexyl) ethanolamine | 140 | 118 | 8.5 | 25.7 |
| 3E | Di-(2-ethyl hexyl)isopropanolamine | 142 | 122 | 10.1 | >55 |
| 3F | Butyl diisopropanolamine | 137 | 123 | 9.1 | 21.9 |

Comparison of the foam rise times indicated in the above table and porosity figures obtained at the two concentrations of each amine catalyst indicates that the rise times were only slightly decreased and with the exception of Example 3A, the foam porosities were much worse, at the higher concentration of amine catalysts. It is clear therefore, that it is not possible to obtain a balanced foam system merely by increasing the concentration of an amine catalyst which exhibits poor activity due to molecular complexity or steric hindrance factors.

The figures in columns 3 and 5 of the above table are taken from the table in Example II numbers 2G to 2L respectively.

EXAMPLE IV

It is important that any new catalyst system should be applicable under the widest possible foaming conditions. Amongst the more critical formulations are those involving the production of low density foams. It is usual to employ as auxiliary blowing agent, a volatile chlorofluoro containing compound such as trichlorofluoromethane (B.P.=23.8° C.) or dichloro-difluoromethane (B.P.=−29.8° C.) in order to achieve low foam densities. Methylene chloride (B.P.=40° C.) may be employed as blowing agent although its higher boiling point necessitates using higher polyol stream temperatures in order fully to utilise to the full the blowing potentialities. Difficulties may be created in producing a stable foam particularly during the initial stages of a "one-shot" process due to the lowering of the polyol stream viscosity and of normal flexible foams used in load bearing applications.

The formulation employed in the hand-mixing experiment differed considerably from that normally used in the presence of diaza-bicyclo-octane as amine catalyst. When the latter is incorporated, it has not been found possible using an 80:20 blend of a glycerol based polyoxypropylene triol of 1050 and 3000 average molecular weight respectively, to utilise more than 0.05 part of stannous octoate per hundred parts of polyol. In addition the T.D.I. index necessary to produce a foam having an acceptable compression set was 85. Employing dimethylethanolamine as amine catalyst however, it is possible to reduce the T.D.I. index to 75; to employ considerably more stannous octoate; and to effect an appreciable decrease in the foam rise time. This latter factor is of importance in commercial block foam production where it is essential that the foam should possess sufficient mechanical strength to be self-supporting at the end of the first section of the conveyor system after which side supporting members are not normally present.

The formulation adopted to produce super-soft foam using dimethylethanolamine as the amine catalyst was as follows:

Polyoxypropylene triol (AV.M.W.=1050)—80 p.b.w.
Polyoxypropylene triol (AV.M.W.=3000)—20 p.b.w.
Stannous octoate—0.125 p.b.w.
Water—3.6 p.b.w.
Dimethylethanolamine—1.8 p.b.w.
Silicone oil L–520—1.5 p.b.w.

Trichlorofluoromethane—10 p.b.w.
80/20 Tolylene di-isocyanate
  (T.D.I. Index=75)—42.5 p.b.w.
Mixing:
  Speed r.p.m.—3000
  Time secs.—6
Foam rise time, seconds—117
Foam height, cms.—20.6
Sinking back after completion of rise—Nil
Foam density, lbs./ft.³—1.56
Resilience, percent rebound—16
Indentation hardness characteristics:
  Lbs./50 sq.ins. at—
    25% deflection—5.7
    50% deflection—8.6
    65% deflection—13.2
Compression set (after 22 hours at 75%
  compression)—4.6%

EXAMPLE VI

The previous example illustrates the use of a dialkylalkanolamine as catalyst in a formulation for the preparation of a medium density "super-soft" foam by the hand-mixing technique described above. The wider application of the amine catalysts of the present invention to the production of very low density "super-soft" foams in formulations containing high concentrations of water and trichlorofluoromethane as auxiliary blowing agent is illustrated in Example VI. The use of dimethylethanolamine as catalyst for the blowing reaction permits the stannous concentration to be increased and in consequence, foams prepared from such a system possess relatively short rise times. It is frequently required to increase the length of the side supports in block foaming operations in order to accommodate the slow rise and preliminary cure times when processing low density "super-soft" foams. However, "super-soft" foams may be processed using formulations based on the new dialkylalkanolamine catalysts on conventional block foaming machines without providing side supports of increased length.

A typical "one-shot" formulation based on an 80:20 mixture of polyoxypropylene triols (with average molecular weights of 1050 and 3000 respectively) employing dimethylethanolamine as the tertiary amine catalyst, was processed through a 4 stream urethane foam metering and mixing machine, operating at a total throughput of 30 lbs./per minute. The composition of the formulation was as follows:

Stream temperature: P.b.w.
  (I) 24° C. polyoxypropylene triol:
    Av. M.W. 1050  80 ⎫
    Av. M.W. 3000  20 ⎭ ——————————  98
  (II) 24° C. polyoxypropylene triol:
    Av. M.W. 1050  80 ⎫
    Av. M.W. 3000  20 ⎭ ——————————  2.0
    Freon 11 ——————————————————————  2.0
    Stannous octoate —————————————  0.27
  (III) 24° C.:
    Water ——————————————————————————  4.8
    Dimethylethanolamine ———————————  1.0
    Silicone oil L-520 —————————————  2.0
  (IV) Freon 11 ———————————————————— 20.0
  (V) 22° C. 80/20 Tolylene di-isocyanate
    (T.D.I. Index=85) —————————————— 57.8

The mixer employed on the machine consisted of a parallel-sided barrel fitted with a "corn-cob" 2 stage high shear mixer. The speed of rotation was 100 r.p.m. 15" square boxes were filled from the machine and cured in the normal manner i.e. for 2 hours at 120° C. The foams were removed from the boxes and sliced into 2½" thick sections starting from the base. The base sections were discarded. The next four sections, designated as follows:

Lower middle—LM
Middle—M
Upper middle—UM were used in the following fashion.

The LM and T sections were used for determination of Tensile strength and Elongation at break, Tear strength, Compression set and Resilience.

The M and UM sections were used to determine the Indentation hardness values using the 12" indentor as specified in British Standard Specification No. 3379:1961, Appendix A.

The Middle section was used to determine the mean foam density.

No difficulties were encountered during or after the preparation of the foam samples. The rate of foam rise was steady throughout the whole rise period and the physical test figures are given below.

Physical test results—one-shot "super-soft" urethane foams prepared with dimethylethanolamine as the sole amine catalyst Foam rise time, secs. ———————————————————————— 70
Indentation hardness (B.S. 3667–63) at—
  25% deflection, kgs. ——————————————————— 7.3
  50% deflection, kgs. ——————————————————— 10.8
  65% deflection, kgs. ——————————————————— 17.2
Ratio of 65/25% compression loadings ———————— 2.4
Loss in hardness on return to 25% compression,
  percent ———————————————————————————————— 24.3
Tensile strength, p.s.i. ——————————————————— 10.3
Percent change on heat ageing ——————————————— Nil
Percent change on humidity ageing ——————————— +12.0
Elongation at break, percent ———————————————— 215
Percent change on heat ageing ——————————————— Nil
Percent change on humidity ageing ——————————— +6.0
Tear strength, lbs./linear inch ————————————— 1.9
Resilience, rebound percent ————————————————— 17.0
75% compression set (after 22 hrs. at 70° C.),
  percent ———————————————————————————————— 11.0

The foam possessed a fine even structure and offered little resistance to the passage of air.

EXAMPLE VII

A typical "one-shot" foam formulation based on a polyoxypropylene triol of 3000 average molecular weight and diethyl ethanolamine as tertiary amine catalyst was processed through a 3-stream urethane foam metering and mixing machine operating at a total throughput of 4.2 kg. per minute. The composition of the formulation was as follows:

Stream temperature: P.b.w.
  (I) 24° C.:
    Polyoxyalkylene triol (av. M.W.=3000) __ 100
    Stannous octoate ——————————————————————— 0.3
  (II) 22° C.:
    Water —————————————————————————————————— 3.6
    Diethylethanolamine ———————————————————— 0.5
    Silicone oil, L-520 ——————————————————— 1.0
  (III) 24° C.:
    80/20 tolylene di-isocyanate ——————————— 47.0

The mixer employed on the machine consisted of a parallel sided barrel fitted with a conical end section, the barrel consisting of eight rows of stationary pegs, four pegs to each row. The motor had nine rows of pegs 2 pegs to each row, except for the top and bottom rows which each contained four pegs. The speed of rotation was adjusted to 3000 r.p.m. i.e. similar with that employed with the conventional diaza-bicyclo-octane catalyst. 15" square boxes were filled from the machine and cured in the normal manner i.e. for 2 hours at 120° C. The foams were removed from the boxes and sliced into 2½" thick sections starting from the base. The base sections were discarded. The next four sections, designated as follows:

Lower middle—LM
Middle—M
Upper middle—UM
Top—T were used in the following fashion.

The LM and T sections were used for determination of Tensile strength and Elongation at break, Tear strength, Compression set and Resilience.

The M and UM sections were used to determine the Indentation hardness values using the 12" indentor as specified in British Standard Specification No. 3,379:1961, Appendix A.

The Middle section was used to determine the mean foam density.

No difficulties were encountered during or after the preparation of the foam samples. The rate of foam rise was steady throughout the whole rise period and the physical test figures given below compare very favourably in all respects with those of machine made foams prepared from conventional formulations:

Physical test results on one-shot urethane foams prepared with diethylethanolamine as sole amine catalyst

| | |
|---|---|
| Foam rise time, secs. | 70 |
| Indentation hardness—12" indentor— | |
| At 25% deflection, kgs. | 27.1 |
| At 40% deflection, kgs. | 32.5 |
| Tensile strength, p.s.i. | 22.6 |
| Percent change on heat ageing | −2.6 |
| Percent change on humid ageing | −2.9 |
| Elongation at break, percent | 223 |
| Percent change on heat ageing | −6.3 |
| Percent change on humid ageing | +1.8 |
| Tear strength, lbs./linear inch | 3.0 |
| Resilience, rebound percent | 46.2 |
| Compression set at 70° C.: | |
| 75% compression, percent set | 5.1 |
| 90% compression, percent set | 6.6 |

EXAMPLE VIII

The utility of β-hydroxyl containing the tertiary amines of this invention is not limited to the production of medium and low density foams. This example illustrates the use of dialkylmonoalkanolamine catalyst for the production of a high density flexible foam containing an inorganic filler. With such a system in which relatively low water concentrations are employed, the use of a tertiary amine catalyst possessing substantial activity for the gelation reaction in addition to the blowing reaction is a disadvantage, since relatively greater acceleration of the blowing reaction is required in order to produce foams possessing open cell structure. Using dimethylethanolamine in conjunction with stannous octoate it is possible to separate the blowing and polymerisation functions more precisely thereby ensuring a balanced formulation.

On formulation established for the preparation of a high density filled foam using dimethyl ethanolamine was as follows:

Stream temperature: P.b.w.
(I) 24° C.:
 Polyoxypropylene triol _____ 100
 Barium sulphate [1] _____ 70
 Stannous octoate _____ 0.35
(II) 24° C.:
 Water _____ 2.2
 Dimethylethanolamine _____ 1.5
 Silicone oil, L–520 _____ 2.0
(III) 24° C.:
 Tolylene di-isocyanate (T.D.I. Index 108) _ 32.3
Mixing speed r.p.m., 2500–3000.

[1] Grade A 2764 white barytes.

The foam formulation was processed on the three stream metering and mixing machine described in Example VII operated at a total throughput of 5 kg. per minute. The foam mix was poured into 15" square boxes and rose to maximum height in 95 seconds. After curing for 2 hours at 120° C., and standing overnight at room temperature, a section cut from the middle of the sample was found to have the following physical properties:

| | |
|---|---|
| Foam density, lbs./ft.³ | 4.0 |
| Indentation hardness characteristics: | |
| Lbs./50 sq. inches, 2 inch section at— | |
| 25% deflection | 35.2 |
| 65% deflection | 100 |
| Ratio of 65%/25% compression loadings | 2.84 |
| 75% compression set (after 22 hrs. at 70° C.) | 4.5 |
| Resilience percent rebound | 40 |

The foam possessed fine even structure, open to the passage of air.

We claim:
1. A process for the preparation of flexible polyurethane foams comprising: reacting a mixture of a polyether reactant selected from the group consisting of polyoxyalkylene glycol ether diols having a molecular weight of from 1000 to 3000, polyoxyalkylene glycol ether triols having a molecular weight of from 1000 to 6000 and mixtures thereof, a tolylene diisocyanate reactant consisting essentially of 80% 2:4 isomer and 20% 2:6 isomer, and, for each 100 parts by weight of said polyether reactant:
 (a) from 1 to 5 parts by weight of water,
 (b) from 0.5 to 3 parts by weight of a foam stabilizing agent comprising a polysiloxane polyoxyalkylene copolymer,
 (c) from 0.2 to 1.2 parts by weight of stannous octoate or stannous oleate, and
 (d) from 0.3 to 1.2 parts by weight of an amine selected from the group consisting of N,N-dimethyl ethanol amine, N,N-diethylethanol amine, and N,N-dimethyl isopropanolamine, in the substantial absence of other amine catalysts containing two nitrogen atoms in their molecules; the amount of said tolylene dissocyanate reactant being from about 75 to 110% of the amount theoretically required to react with all of the hydroxyl groups and water present in the system.

2. The process of claim 1 in which the amine is N,N-dimethyl ethanolamine.

3. The process of claim 1 in which the amine is N,N-diethyl ethanolamine.

4. The process of claim 1 in which the amine is N,N-dimethyl isopropanolamine.

5. The process of claim 1 in which the polyether reactant contains a major proportion of polyether triol, the amount of tolylene diisocyanate reactant is less than 100% of the said theoretical amount and supersoft foams are produced.

References Cited

FOREIGN PATENTS

| 243,307 | 4/1960 | Australia. |
| 243,374 | 2/1963 | Australia. |
| 628,220 | 9/1961 | Canada. |
| 930,635 | 7/1963 | Great Britain. |

DONALD E. CZAJA, Primary Examiner

H. S. COCKERAM, Assistant Examiner

U.S. Cl. X.R.

260—77.5